United States Patent Office 3,705,903
Patented Dec. 12, 1972

3,705,903
2-CARBAMIDO AND THIOCARBAMIDO OXAZOLES
George Crank, Engadine, New South Wales, Australia, assignor to Lilly Industries, Ltd.
No Drawing. Continuation-in-part of abandoned application Ser. No. 53,982, July 10, 1970. This application Nov. 9, 1970, Ser. No. 88,085
Claims priority, application Great Britain, July 22, 1969, 36,859/69; Nov. 5, 1969, 54,290/69
Int. Cl. C07d 85/44
U.S. Cl. 260—307 R                  12 Claims

ABSTRACT OF THE DISCLOSURE 2-carbamido and thiocarbamidooxazoles of the formula

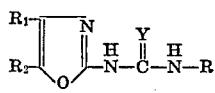

where Y is O or S and R is hydrogen, alkyl or aryl and $R_1$ and $R_2$ are H, alkyl, aryl, $CF_3$, carbalkoxy or carboxamido; are prepared by reacting a 2-aminooxazole with an aryl or alkyl isocyanate or isothiocyanate. The carbamido and thiocarbamidooxazoles are useful in alleviating inflammation in warm-blooded mammals and the thiocarbamidooxazoles are particularly useful in method for controlling fungus infections in plants.

CROSS-REFERENCE TO RELATED APPLICATIONS

This application is a continuation-in-part of my copending application Ser. No. 53,982, filed July 10, 1970, and now abandoned.

SUMMARY

This invention relates to novel chemical compounds having valuable fungicidal and antiinflammatory properties. In particular, it relates to 2-oxazolylthioureas and 2-oxazolylureas represented by the following formula

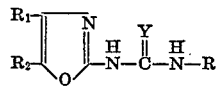

wherein Y is an oxygen atom or a sulfur atom, R is hydrogen, $C_1$–$C_{12}$ alkyl, $C_5$–$C_7$ cycloalkyl, allyl, phenyl, benzyl, β-phenethyl, naphthyl or substituted phenyl, and $R_1$ and $R_2$ are the same or different and represent hydrogen, $C_1$–$C_4$ lower alkyl, trifluoromethyl, carbalkoxy, carboxamido, phenyl or substituted phenyl and when Y is a sulfur atom $R_1$ and $R_2$ are other than carbalkoxy and carboxamido.

The 2-oxazolyl urea and thiourea compounds described herein are prepared by the reaction of 2-aminooxazole or a substituted 2-aminooxazole with an alkyl or aryl isocyanate or an alkyl or aryl isothiocyanate. Alternatively, the 2-isocyano or 2-isothiocyano derivative of oxazole or of a substituted oxazole is reacted with an alkyl or aryl amine to form a compound of the invention.

The 2-oxazolylthiourea compounds described herein inhibit the growth of microorganisms which are pathogenic to animal and plant life. In particular the thiourea compounds of this invention are highly effective antifungal agents useful for the control of plant pathogens, for example *Piricularia oryzae, Phytophtora infestans, Collelotrichum lagenarium, Helminthosporum sativum* and *Botrytis cinerea*, the causative organisms of rice blast, tomato late blight, anthracnose of cucumbers, leaf spot of barley and gray mold of grapes respectively.

The compounds of the invention, both ureas and thioureas, are useful anti-inflammatory agents in that they alleviate the symptoms associated with the inflammatory process in mammalian tissue.

DETAILED DESCRIPTION

The antimicrobial and antiinflammatory 2-oxazolyl ureas and thioureas of the present invention are characterized by the structural features of a 5-membered heterocyclic oxazole ring substituted in the 2-position with a carbamido, thiocarbamido or an alkyl or aryl substituted carbamido or thiocarbamido group, and in the 3 and/or 4-position with an aryl, alkyl, carbalkoxy or carboxamido group.

The following structural formula represents the compounds of the invention:

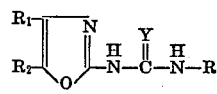

wherein Y is an oxygen atom or a sulfur atom, R is hydrogen, $C_1$–$C_{12}$ alkyl, $C_5$–$C_7$ cycloalkyl, allyl, phenyl, benzyl, β-phenethyl, naphthyl or substituted phenyl, $R_1$ and $R_2$ are the same or different and represent hydrogen, $C_1$–$C_4$ lower alkyl, trifluoromethyl, carbalkoxy, carboxamido, phenyl or substituted phenyl and when Y is a sulfur atom $R_1$ and $R_2$ are other than carbalkoxy and carboxamido.

The term "$C_1$–$C_{12}$ alkyl" as used herein refers to the straight and branched aliphatic hydrocarbons chains such as methyl, ethyl, n-propyl, isopropyl, n-butyl, sec-butyl, tert-butyl, n-amyl, n-hexyl, n-heptyl, n-octyl, iso-octyl, n-nonyl, n-decyl, n-undecyl, dodecyl and the like. "$C_1$–$C_4$ lower alkyl" refers to the straight or branched aliphatic hydrocarbon chains containing up to 4 carbon atoms such as those enumerated in the preceding definition. The term "substituted phenyl" refers to phenyl substituted at one or more positions by $C_1$–$C_4$ lower alkyl, $C_1$–$C_4$ lower alkoxy, halogen, trifluoromethyl or nitro and includes, 4-methylphenyl, 3,4-dimethylphenyl, 4-isopropylphenyl, p-nitrophenyl, 3,4 - dichlorophenyl, 4 - sec-butylphenyl, p-methoxyphenyl, 3 - methoxy-4-ethoxyphenyl, 3-trifluoromethylphenyl, 4 - isopropoxyphenyl, 3 - bromophenyl, 4-fluorophenyl, 3,5 - dimethylphenyl and like substituted phenyl groups. Naphthyl refers to both α-naphthyl and β-naphthyl. Carbalkoxy refers to the $C_1$–$C_4$ alkoxy carbonyl radicals such as methoxycarbonyl, ethoxycarbonyl, isopropoxycarbonyl, n-butoxycarbonyl and the like and carboxamido refers to the primary carboxylic acid amide function and the $C_1$–$C_4$ lower alkyl substituted carboxylic acid amide function for example, N,N-dimethylcarboxamido, N-ethylcarboxamido, N,N-di(n-butyl-carboxamido and the like. The term halogen as used herein refers to fluoro, chloro, bromo and iodo, chloro and bromo representing preferred species.

The 2-oxazolyl urea and thiourea compounds represented by the above formula are prepared by the reaction of 2-aminooxazole or a substituted 2-aminooxazole with an alkyl or aryl isocyanate or isothiocyanate according to the following equation.

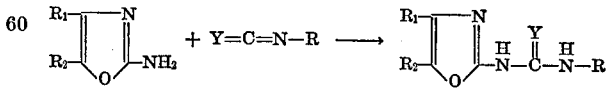

wherein Y, R, $R_1$ and $R_2$ have the same meanings as previously assigned. The reaction is carried out by heating equimolar amounts of the aminooxazole and isothiocyanate or isocyanate in a substantially dry, unreactive solvent such as toluene, xylene, pyridine or other suitable solvent. Generally the reaction mixture is heated to the reflux temperature and refluxed for about 4 to 20 hours. The 2-oxazolyl thiourea or urea reaction product is isolated by evaporating the reaction mixture to remove solvent and extracting the product from the residue with a solvent such as ethanol. The ethanolic extract containing the reaction product can be decolorized, if necessary, by boiling the extract with charcoal. The clarified extract is evaporated to a lesser volume until the product commences to crystallize. The 2-oxazolyl thiourea or urea thus obtained can be further purified if desired by recrystallization from ethanol or other suitable solvent.

Alternatively, the compounds of this invention can be prepared by the reaction of 2-isothiocyanooxazole, 2-isocyanooxazole, or a derivative thereof with an alkyl or aryl amine as shown in the following equation,

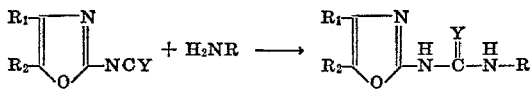

wherein Y, R, $R_1$ and $R_2$ have the same meanings as defined previously. This alternative method of preparing the compounds of the invention is carried out generally in the same manner as the previously discussed preparative method. For example, the 2-isothiocyano oxazole or isocyanooxazole is reacted with an equimolar amount of the appropriate alkyl or aryl amine in a solvent such as toluene at the reflux temperature of the reaction mixture. The 2-oxazolyl thiourea or urea reaction product is isolated from the reaction mixture in essentially the same manner as described in the preceding method. 2-isothiocyanooxazole or 2-isocyanooxazole can be prepared from 2-aminooxazole by employing a conventional method for the synthesis of isothiocyanates or isocyanates as for example, by the reaction of 2-aminooxazole with thiophosgene or phosgene.

The preferred method for the preparation of the compounds of the invention is the former described method which employs the reaction of a 2-aminooxazole with an alkyl or an aryl isothiocyanate or isocyanate.

The following compounds are representative of the compounds of the invention described by the foregoing general formula:

2-oxazolyl thiourea
1-methyl-3-(2-oxazolyl)thiourea
1-ethyl-3-(2-oxazolyl)thiourea
1-methyl-3-[4-(3',4'-xylyl)-2-oxazolyl]thiourea
1-methyl-3-(5-p-chlorophenyl-2-oxazolyl)thiourea
1-ethyl-3-(4-p-trifluoromethylphenyl-2-oxazolyl)thiourea
1-methyl-3-(4-p-trifluoromethylphenyl-2-oxazolyl) thiourea
1-n-propyl-3-(2-oxazolyl)thiourea
1-isopropyl-3-(2-oxazolyl)thiourea
1-n-butyl-3-(2-oxazolyl)thiourea
1-iso-butyl-3-(2-oxazolyl)thiourea
1-n-amyl-3-(2-oxazolyl)thiourea
1-n-hexyl-3-(2-oxazolyl)thiourea
1-n-heptyl-3-(2-oxazolyl)thiourea
1-n-octyl-3-(2-oxazolyl)thiourea
1-iso-octyl-3-(2-oxazolyl)thiourea
1-n-decyl-3-(2-oxazolyl)thiourea
1-n-dodecyl-3-(2-oxazolyl)thiourea
1-(4,5-dimethyl-2-oxazolyl)thiourea
1-methyl-3-(4-methyl-2-oxazolyl)thiourea
1-cyclohexyl-3-(2-oxazolyl)thiourea
1-cyclopentyl-3-(2-oxazolyl)thiourea
1-methyl-3-(4,5-dimethyl-2-oxazolyl)thiourea
1-n-butyl-3-(4,5-dimethyl-2-oxazolyl)thiourea
1-methyl-3-(4-n-propyl-2-oxazolyl)thiourea
1-allyl-3-(2-oxazolyl)thiourea
1-allyl-3-(4,5-dimethyl-2-oxazolyl)thiourea
1-phenyl-3-(2-oxazolyl)thiourea
1-p-tolyl-3-(2-oxazolyl)thiourea
1-(4-chlorophenyl)-3-(2-oxazolyl)thiourea
1-benzyl-3-(2-oxazolyl)thiourea
1-β-phenethyl-3-(2-oxazolyl)thiourea
1-(4-trifluoromethylphenyl)-3-(2-oxazolyl)thiourea
1-(4-n-butylphenyl)-3-(2-oxazolyl)thiourea
1-(4-isopropylphenyl)-3-(2-oxazolyl)thiourea
1-(4-fluorophenyl)-3-(2-oxazolyl)thiourea
1-(3-bromophenyl)-3-(2-oxazolyl)thiourea
1-(4-ethylphenyl)-3-(4-n-butyl-2-oxazolyl)thiourea
2-oxazolyl urea
1-methyl-3-(2-oxazolyl)urea
1-n-butyl-3-(2-oxazolyl)urea
1-phenyl-3-(4-methyl-2-oxazolyl)urea
1-α-naphthyl-3-(4,5-dimethyl-2-oxazolyl)urea
1-p-tolyl-3-(2-oxazolyl)urea
1-β-phenethyl-3-(4-p-chlorophenyl-2-oxazolyl)urea
1-methyl-3-(4,5-dicarbethoxy-2-oxazolyl)urea
1-ethyl-3-(4-ethyl-5-carbomethoxy-2-oxazolyl)urea
1-phenyl-3-(4-carboxamido-2-oxazolyl)urea
1-n-butyl-3-(4,5-diethyl-2-oxazolyl)urea
1-iso-propyl-3-(4-N,N-diethylcarboxamido-2-oxazolyl) urea
1-allyl-3-(2-oxazolyl)urea
1-benzyl-3-(4,5-diethyl-2-oxazolyl)urea
1-(4-methoxyphenyl)-3-(4,5-diphenyl-2-oxazolyl)urea
1-methyl-3-(4-p-bromophenyl-5-carboethoxy-2-oxazolyl) urea
1-(4-ethylphenyl)-3-(2-oxazolyl)urea
1-n-hexyl-3-(4,5-dimethyl-2-oxazolyl)urea
1-(o-tolyl)-3-(4-p-chlorophenyl-2-oxazolyl)urea
4,5-diphenyl-2-oxazolyl urea and the like.

As previously mentioned, the 2-oxazolyl thiourea compounds of this invention are fungicidally active and are useful for the control of fungi pathogenic to economically important plant life.

Table I which follows contains the test results obtained with representative 2-oxazolyl thioureas in standard foliar fungicide tests. As shown, the compounds display significant fungicidal activity against the diseases tomato late blight, rice blast, anthracnose of cucumber and Helminthosporum leaf spot of barley.

The results shown were obtained in tests carried out as described in the following paragraphs. In each test the compound was formulated as an aqueous emulsion or solution at a concentration of 400 p.p.m. and applied as a foliar spray.

Rice blast: The aqueous emulsion of the test compound was applied to all leaf surfaces of 14-day-old rice plants of the NATO variety and allowed to dry. The foliage was then inoculated with a water suspension of conidia (*Piricularia oryzae* race N-1) by means of a sprayer. The treated plants were placed in a moist chamber at 65° F. for 40 hours before being returned to the greenhouse. Eight days thereafter, the symptoms of the blast disease were observed and compared with control plants.

Cucumber anthracnose: The aqueous emulsion of the test compound was sprayed on all leaf surfaces of 15-day-old cucumber plants (green Prolific variety) and allowed to dry. The foliage was then inoculated with a water suspension of conidia (*Collectotrichum lagenarium*) by means of a sprayer.

Following inoculation, the treated plants were placed in a moist chamber maintained at 75° C. for 40 hours after which the plants were returned to the greenhouse. On the tenth day following treatment and inoculation the symptoms were observed and recorded and compared with control plants.

Tomato late blight: The aqueous emulsion of the test compound was sprayed on all leaf surfaces of 28 day old tomato plants of the Bonnie Best variety and allowed to dry. The plants were then inoculated with a water suspension of fungal propagules (*Phytophthora infestans*) by means of a sprayer. The plants were placed in a moist chamber maintained at a temperature of 65° F. for 24 hours after which they were returned to the greenhouse. Three days thereafter, the symptoms of late blight disease were observed and recorded and compared with control plants.

Helminthosporum leaf spot of barley: The aqueous emulsion of the test compound was sprayed on 6 day old barley seedlings 4–5 inches tall of the Larker variety and allowed to dry. The plants were then inoculated with an aqueous suspension of spores of *Helminthosporum sativum* and placed in a moist chamber at 65° F. for 48 hours. Two days later the plants were removed from the chamber and placed in the greenhouse. Four days thereafter, or twelve days from planting, the symptoms of leaf spot disease were observed and recorded and the results were compared with control plants.

TABLE I.—FUNGICIDAL ACTIVITY OF 2-OXAZOYL THIOUREAS

| Compound name | Activity rating [1] at 400 p.p.m. vs.— | | | |
|---|---|---|---|---|
| | Rice blast | Cucumber anthracnose | Tomato late blight | Barley leaf spot |
| 1-methyl-3-(2-oxazolyl)thiourea | 5 | 5 | 4 | 4 |
| 1-methyl-3-(4-methyl-2-oxazolyl)thiourea | 4 | 4 | 5 | 3 |
| 1-methyl-3-(4,5-dimethyl-2-oxazolyl)thiourea | 4 | 4 | 3 | 1 |
| 1-ethyl-3-(2-oxazolyl)thiourea | 4 | 4 | 2 | 3 |
| 1-n-propyl-3-(2-oxazolyl)thiourea | 5 | 4 | 1 | 4 |
| 1-n-propyl-3-(4,5-dimethyl-2-oxazolyl)thiourea | 5 | 4 | 1 | 3 |
| 1-iso-propyl-3-(2-oxazolyl)thiourea | 3 | 5 | 1 | 1 |
| 1-allyl-3-(2-oxazolyl)thiourea | 5 | 4 | 1 | 3 |
| 1-n-butyl-3-(2-oxazolyl)thiourea | 5 | 4 | 1 | 4 |
| 1-n-butyl-3-(4,5-dimethyl-2-oxazolyl)thiourea | 3 | 4 | 3 | 3 |
| 1-iso-butyl-3-(2-oxazolyl)thiourea | 4 | 5 | 2 | 4 |
| 1-n-amyl-3-(2-oxazolyl)thiourea | 4 | 4 | 3 | 4 |
| 1-n-octyl-3-(2-oxazolyl)thiourea | 4 | 4 | 2 | 3 |
| 1-cyclohexyl-3-(2-oxazolyl)thiourea | 4 | 5 | 2 | 1 |
| 1-benzyl-3-(2-oxazolyl)thiourea | 5 | 4 | 1 | 3 |
| 1-β-phenethyl-3-(2-oxazolyl)thiourea | 5 | 4 | 2 | 4 |

[1] Activity rating: 1=No control; 2=Slight control; 3=Moderate control; 4=Good control; 5=Complete control.

The 2-oxazolyl thioureas described herein are also useful in combating infections caused by the organism *Botrytis cinerea*, for example, gray mold of grapes.

The 2-oxazolyl thioureas also possess significant activity against Root Knot nematodes.

The fungicidally active 2-oxazolyl thioureas can be employed for the protection of plants susceptible to pathogenic fungi and thereby prevent the onset of disease symptoms. They can likewise be used in the treatment of infected plants. When so used, the 2-oxazolyl thioureas can be formulated as a solution, emulsion or emulsifiable concentrate, or as a dust, however, they are preferably formulated as a solution suitable for foliar spray application. Aqueous solutions of the 2-oxazolyl thioureas at concentrations of from about 100 to about 1000 p.p.m. can be prepared with the aid of a solubilizing agent and are useful fungicidal spray solutions when applied to the foliage of susceptible plants. Likewise, aqueous emulsions of the compounds of the invention can be prepared in similar concentrations with the aid of an emulsifier and a solubilizing agent. The aqueous solutions and emulsions desirably contain a wetting agent to enhance the spreadability of the formulations over the leaf surface. Suitable emulsifying agents can be of the ionic or non-ionic types, such as the condensation products of alkylene oxides with phenols and organic acids, polyoxyethylene derivatives of sorbitan esters, aralkyl and alkyl sulfonates and the like.

Concentrated dust formulations can be prepared by incorporating from about 10 to about 25 percent of a 2-oxazolyl thiourea compound in a finely divided inert, solid carrier such as diatomaceous earth, fuller's earth, bentonite, talc, and the like. Such dust formulations can be used directly or they can be further diluted with inert carrier to achieve lower concentrations of the oxazolyl thiourea compound.

The 2-oxazolyl thioureas of this invention also possess useful anti-bacterial activity against both gram-negative and gram-positive bacteria, particularly the latter. For example, the minimum inhibitory concentrations of compounds of the invention against *Aerobacter aerogenes*, *Brucella bronchineptica*, *Escherichia coli*, *Klebsiella aerogenes*, and *Salmonella typhimurium* normally lie between 16 and 64 µg./ml. whilst the minimum inhibitory concentrations against gram-positive bacteria such as *Staphylococcus aureus* and *Streptococcus faecalis* normally lie between 2 and 16 µg./ml.

Accordingly, the present invention provides a method of treating bacterial infections in animals which method comprises administering to the animal an effective non-toxic dose of a 2-oxazolyl thiourea of this invention. The dose administered will normally lie between 5 to 150 mg./kg. although it will be appreciated that the dose may lie outside these limits and will depend on a variety of factors including the condition of the patient, the infection being treated and its severity. The compounds may be used externally or internally, for example orally, and for this purpose they will normally be formulated into a suitable composition form comprising the active compound and a pharmaceutically acceptable carrier therefor. The compositions may take the form of tablets, capsules, powders, injection, solutions and the like, as is well known in the pharmaceutical art.

Both the urea and thiourea compounds of this invention exhibit antiinflammatory activity when administered parenterally or orally to warm blooded mammals. Accordingly, they are useful in the treatment of inflammation of mammalian tissue and especially for alleviating the discomforting symptoms related thereto such as fever, sensitivity to the touch, swelling and pain. The 2-oxazolyl ureas, being somewhat more active, are preferred and are effective in alleviating and controlling inflammation in warm-blooded mammals when administered orally at a daily dose of about 25 mg./kg. to about 150 mg./kg. of body weight. The compounds of the invention can be formulated for oral administration in any of the commonly employed oral dosage formulations such as tablets, capsules or liquid suspensions. In such dosage form the compounds can be suitably formulated with a pharmaceutically acceptable carrier as for example in tablet form with glucose, starch and a binding agent.

The compounds of the invention can be administered as a single daily dose or preferably as multiple smaller doses throughout the day, for example 2 to 6 times daily. The level of dose required as well as the duration of treatment with any particular host is dependent on a variety of factors such as the intensity and extent of the inflammation, the type of tissue involved in the inflammatory process, the general health of the host and the origin of the inflammation.

This invention is more fully illustrated by the following examples.

EXAMPLE 1

To a solution of 3.36 g. (0.4 mole) of 2-aminooxazole in 15 ml. of pyridine was added 2.92 g. (0.4 mole) of methyl isothiocyanate and the reaction solution was heated at the reflux temperature for 16 hours. The pyridine was removed from the reaction mixture by evaporation and the residue was extracted with ethanol. The ethanol extract was clarified with charcoal and evaporated until crystallization of the product commenced. The crystalline product was filtered to yield 3.2 g. of 1-methyl-3-(2-oxazolyl)thiourea as white crystals melting at about 176° C. after recrystallization from chloroform.

Elemental analysis for $C_5H_7N_3OS$.—Theory (percent): C, 38.2; H, 4.5; N, 26.7. Found (percent): C, 38.0; H, 4.5; N, 26.8.

In a similar manner the following compounds were prepared by the reaction of 2-aminooxazole with the indicated isothiocyanate:

1-ethyl-3-(2-oxazolyl)thiourea melting at about 127° C., was prepared with ethyl isothiocyanate;

1-n-propyl-3-(2-oxazolyl)thiourea, melting at about 126° C. was prepared with n-propyl isothiocyanate;

1-iso-propyl-3-(2-oxazolyl)thiourea, melting at about 110° C., was prepared with iso-propyl isothiocyanate;

1-n-butyl-3-(2-oxazolyl)thiourea, melting at about 121° C. was prepared with n-butyl isothiocyanate;

1-n-amyl-3-(2-oxazolyl)thiourea melting at about 77° C. was prepared with n-amyl isothiocyanate;

1-n-octyl-3-(2-oxazolyl)thiourea, melting at about 96° C., was prepared with n-octyl isothiocyanate;

1-iso-butyl-3-(2-oxazolyl)thiourea, melting at about 140° C., was prepared with iso-butyl isothiocyanate;

1-allyl-3-(2-oxazolyl)thiourea, melting at about 85° C. was prepared with allyl isothiocyanate;

1-benzyl-3-(2-oxazolyl)thiourea, melting at about 138° C., was prepared with benzyl isothiocyanate;

1-phenyl-3-(2-oxazolyl)thiourea, melting at about 265° C., was prepared with phenyl isothiocyanate;

1-β-phenethyl-3-(2-oxazolyl)thiourea, melting at about 130° C., was prepared with β-phenylethyl isothiocyanate;

1-cyclohexyl-3-(2-oxazolyl)thiourea, melting at about 143° C., was prepared with cyclohexyl isothiocyanate.

EXAMPLE 2

To 75 ml. of dry toluene were added 5.6 g. of 2-amino-4,5-dimethyloxazole and 3.65 g. of methyl isothiocyanate and the reaction mixture was heated at the reflux temperature for 20 hours. The toluene was removed from the reaction mixture by evaporation and the residue was extracted with ethanol. The ethanol extract was clarified with charcoal and reduced in volume by evaporation until crystallization of the reaction product commenced. The crystalline product was filtered and dried to yield 4.1 g. of 1-methyl-3-(4,5-dimethyl-2-oxazolyl)thiourea as pale yellow crystals melting at about 168° C. after recrystallization from ethanol.

Elemental analysis for $C_7H_{11}N_3OS$.—Theory (percent): C, 45.40; H, 5.98; N, 22.68. Found (percent): C, 45.44; H, 5.71; N, 22.93.

In a similar manner the following compounds were prepared by the reaction of 2 - amino - 4,5 - diphenyloxazole with the indicated isothicyanate:

1-n-propyl-3-(4,5-dimethyl - 2 - oxazolyl)thiourea melting at about 133° C., was prepared with n-propyl isothiocyanate;

1-allyl-3-(4,5-dimethyl - 2 - oxazolyl)thiourea, melting at about 150° C., was prepared with allyl isothiocyanate.

In a similar manner the following compounds were prepared by the reaction of 2-amino-4,5-diphenyloxazole with the indicated isothiocyanate:

1-methyl-3-(4,5-diphenyl-2-oxazolyl)thiourea, melting at about 230° C., was prepared with methyl isothiocyanate.

1-ethyl-3-(4,5-diphenyl-2-oxazolyl)thiourea, melting at about 198° C., was prepared with ethyl isothiocyanate.

Similarly by reaction of 2-amino-4-methyloxazole with methyl isothiocyanate and 2-amino-4-trifluoromethyloxazole with ethyl isothiocyanate, there were obtained respectively:

1-methyl-3-(4-methyl - 2 - oxazolyl)thiourea melting at about 192° C., and 1-ethyl-3-(4-trifluoromethyl-2-oxazolyl)thiourea melting at about 172° C.

EXAMPLE 3

To a solution of 2.52 g. (0.02 mole) of 2-isothiocyanooxazole in 10 ml. of toluene was added 0.62 g. (0.02 mole) of methylamine and the reaction solution refluxed for 16 hours. The toluene was removed by evaporation and the residue extracted with ethanol. The ethanol extract was charcoaled and evaporated until crystallization of the product commenced. After filtration and recrystallization from chloroform, 1-methyl-3-(2-oxazolyl) thiourea was obtained. The product was identical (M.P. and mixed M.P.) with that obtained by the process of Example 1.

Similarly, the other products obtained in Examples 1 and 2, were prepared by the process of this example.

EXAMPLE 4

A solution of 3.36 g. of 2-aminooxazole and 2.84 g. of ethyl isocyanate in 30 ml. of dry toluene was heated at the reflux temperature for 2 hours and was then treated with charcoal. The warm reaction mixture was then filtered and concentrated in vacuo to yield 2.75 g. of 1-ethyl-3-(2-oxazolyl)urea as a white crystalline solid melting at about 163–164° C. after recrystallization from toluene.

Elemental analysis for $C_6H_9N_3O_2$.—Theory (percent): C, 46.4; H, 5.8; N, 26.9. Found (percent): C, 46.2; H, 5.8; N, 27.1.

In a similar manner the following compounds were prepared by the reaction of 2-aminooxazole with the designated isocyanate:

1-n-propyl-3-(2-oxazolyl)urea melting at about 145–146° C. was prepared with n-propyl isocyanate.

Elemental analysis for $C_7H_{11}N_3O_2$.—Theory (percent): C, 49.7; H, 6.5; N, 24.9. Found (percent): C, 49.6; H, 6.8; N, 25.0.

1-isopropyl-3-(2-oxazolyl)urea melting at about 139–140° C. was prepared with isopropyl isocyanate and recrystallized from carbon tetrachloride.

Elemental analysis for $C_7H_{11}N_3O_2$.—Theory (percent): C, 49.7; H, 6.5; N, 24.9. Found (percent): C, 49.7; H, 6.6; N, 25.1

1-n-butyl-3-(2-oxazolyl)urea melting at about 130–131° C. was prepared with n-butyl isocyanate and recrystallized from chloroform.

Elemental analysis for $C_8H_{13}N_3O_2$.—Theory (percent): C, 52.4; H, 7.1; N, 22.9. Found (percent): C, 52.2; H, 7.0; N, 22.8.

1-phenyl-3-(2-oxazolyl)urea melting at about 164–165° C. was prepared with phenyl isocyanate and recrystallized from toluene.

Elemental analysis for $C_{10}H_9N_3O_2$.—Theory (percent): C, 59.2; H, 4.5; N, 20.7. Found (percent): C, 59.3; H, 4.7; N, 20.6.

1-(p - chlorophenyl) - 3 - (2 - oxazolyl)urea melting at about 169°–171° C. was prepared with p-chlorophenyl isocyanate and recrystallized from chloroform.

Elemental analysis for $C_{10}H_8N_3O_2Cl$.—Theory (percent): C, 50.5; H, 3.4; N, 17.7; Cl, 14.9. Found (percent): C, 50.2; H, 3.6; N, 17.6; Cl, 15.1.

1-(m - chlorophenyl) - 3 - (2 - oxazolyl)urea melting at about 162–163° C. was prepared with m-chlorophenyl isocyanate and recrystallized from chloroform.

Elemental analysis for $C_{10}H_8N_3O_2Cl$.—Theory (percent): C, 50.5; H, 3.4; N, 17.7; Cl, 14.9. Found (percent): C, 50.4; H, 3.6; N, 17.6; Cl, 15.0.

1-(O - chlorophenyl) - 3 - (2 - oxazolyl)urea melting at about 170–172° C. was prepared with o-chlorophenyl isocyanate and was recrystallized from carbon tetrachloride.

Elemental analysis for $C_{10}H_8N_3O_2Cl$.—Theory (percent): C, 50.5; H, 3.4; N, 17.7; Cl, 14.9. Found (percent): C, 50.4; H, 3.5; N, 17.4; Cl, 15.2.

1-(o-tolyl)-3-(2-oxazolyl)urea melting at about 165–166° C. was prepared with o-tolyl isocyanate and was recrystallized from carbon tetrachloride.

Elemental analysis for $C_{11}H_{11}N_3O_2$.—Theory (percent): C, 60.8; H, 5.1; N, 19.3. Found (percent): C, 61.1; H, 5.3; N, 19.5.

1-(p-nitrophenyl)-3-(2-oxazolyl)urea melting at about 238° C. d. (yellow solid) was prepared with p-nitrophenyl isocyanate and was recrystallized from ethanodimethylformamide.

Elemental analysis for $C_{10}H_8N_4O_4$.—Theory (percent): C, 48.4; H, 3.2; N, 22.6. Found (percent): C, 48.7; H, 3.5; N, 22.4.

1-(α-naphthyl)-3-(2-oxazolyl)urea melting at about 257–259° C. was prepared with α-naphthyl isocyanate and was recrystallized from toluene.

Elemental analysis for $C_{14}H_{11}N_3O_2$.—Theory (percent): C, 66.4; H, 4.4; N, 16.6. Found (percent): C, 66.7; H, 4.6; N, 16.4.

EXAMPLE 5

A solution of 9.4 g. of 2-amino-4,5-diphenyloxazole and 6.17 g. of phenyl isocyanate in 125 ml. of toluene was heated for 1.5 hours at the reflux temperature. The reaction mixture was evaporated to dryness and the solid residue was purified by recrystallization from chloroform to yield 4.68 g. of 1-phenyl-3-(4,5-diphenyl-2-oxazolyl)urea as a white crystalline solid melting at about 211–213° C.

Elemental analysis for $C_{22}H_{17}N_3O_2$.—Theory (percent): C, 74.4; H, 4.9; N, 11.9. Found (percent): C, 74.4; H, 4.8; N, 11.8.

In a similar manner the following compounds were prepared by the reaction of 2-amino-4,5-diphenyloxazole with the indicated isocyanate:

1 - (m-chlorophenyl)-3-(4,5-diphenyl-2-oxazolyl)urea melting at about 205–207° C. was prepared with m-chlorophenyl isocyanate and was recrystallized from chloroform.

Elemental analysis for $C_{22}H_{16}N_3ClO_2$.—Theory (percent): C, 67.8; H, 4.3; N, 10.9; Cl, 9.3. Found (percent): C, 67.8; H, 4.1; N, 10.8; Cl, 9.1.

1 - ethyl-3-(4,5-diphenyl-2-oxazolyl)urea melting at about 181–182° C. was prepared with ethyl isocyanate and was recrystallized from carbon tetrachloride.

Elemental analysis for $C_{18}H_{17}N_3O_2$.—Theory (percent): C, 70.2; H, 5.6; N, 13.9. Found (percent): C, 70.4; H, 5.6; N, 13.7.

EXAMPLE 6

A solution of 7.84 g. of 2-amino-4,5-dimethyloxazole and 10.7 g. of o-chlorophenyl isocyanate in 300 ml. of toluene was heated for 2.5 hours at the reflux temperature. The reaction mixture was then evaporated to dryness and the solid residue was purified by recrystallization from chloroform to yield 5.35 g. of 1-(o-chlorophenyl)-3-(4,5-dimethyl-2-oxazolyl)urea as white crystals melting at about 167–168° C.

Elemental analysis for $C_{12}H_{12}ClN_3O_2$.—Theory (percent): C, 54.25; H, 4.5; Cl, 13.3; N, 15.8. Found (percent): C, 53.75; H, 4.6; Cl, 13.7; N, 16.0.

In a similar manner the following compounds were prepared by the reaction of 2-amino-4,5-dimethyloxazole with the indicated isocyanate:

1 - (m-chlorophenyl)-3-(4,5-dimethyl-2-oxazolyl)urea melting at about 164–165° C. was prepared with m-chlorophenyl isocyanate and was recrystallized from chloroform.

Elemental analysis for $C_{12}H_{12}ClN_3O_2$.—Theory (percent): C, 54.25; H, 4.6; Cl, 13.3; N, 15.8. Found (percent): C, 54.0; H, 4.7; Cl, 13.5; N, 15.8.

1 - (p-chlorophenyl) - 3-(4,5-dimethyl-2-oxazolyl)urea melting at about 190–191° C. (pale yellow crystalline solid) was prepared with p-chlorophenyl isocyanate and was recrystallized from chloroform.

Elemental analysis for $C_{12}H_{12}ClN_3O_2$.—Theory (percent): C, 54.25; H, 4.6; N, 15.8; Cl, 13.3. Found (percent): C, 54.2; H, 4.5; N, 15.8; Cl, 13.3.

EXAMPLE 7

A solution of 1.96 g. of 2-amino-4-methyloxazole and 1.42 g. of ethyl isocyanate in 20 ml. of toluene was heated for 2 hours at the reflux temperature. The reaction mixture was then evaporated to dryness to yield 1.6 g. of 1-ethyl-3-(4-methyl-2-oxazolyl)urea as an oily residue which crystallized on standing. The crystalline product was recrystallized from carbon tetrachloride and melted at about 132–134° C.

Elemental analysis for $C_7H_{11}N_3O_2$.—Theory (percent): C, 49.7; H, 6.6; N, 24.8. Found (percent): C, 49.9; H, 6.5; N, 25.1.

I claim:

1. A compound of the formula

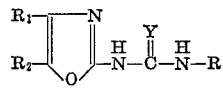

wherein Y is an oxygen or sulfur atom, R is $C_5$–$C_7$ cycloalkyl, allyl, phenyl, benzyl, β-phenethyl, naphthyl, halophenyl, $C_1$–$C_4$ lower alkyl phenyl, nitrophenyl, or trifluoromethyphenyl; $R_1$ and $R_2$ are the same or different and represent hydrogen, $C_1$–$C_4$ lower alkyl, or phenyl.

2. The compound of claim 1 wherein Y is sulfur.
3. The compound of claim 1 wherein Y is oxygen.
4. The compound of claim 2, said compound being 1-phenyl-3-(2-oxazolyl)thiourea.
5. The compound of claim 2, said compound being 1-benzyl-3-(2-oxazolyl)thiourea.
6. The compound of claim 2, said compound being 1-β-phenethyl-3-(2-oxazolyl)thiourea.
7. The compound of claim 2, said compound being 1-cyclohexyl-3-(2-oxazolyl)thiourea.
8. The compound of claim 2, said compound being 1-allyl-3-(4,5-dimethyl-2-oxazolyl)thiourea.
9. The compound of claim 3, said compound being 1-(p-nitrophenyl)-3-(2-oxazolyl)urea.
10. The compound of claim 3, said compound being 1-phenyl-3-(2-oxazolyl)urea.
11. The compound of claim 3, said compound being 1-(o-tolyl)-3-(2-oxazolyl)urea.
12. The compound of claim 3, said compound being 1-(p-chlorophenyl)-3-(4,5-dimethyl-2-oxazolyl)urea.

References Cited

UNITED STATES PATENTS 3,499,910  3/1970  Driscoll _____ 260—306.8

ALEX MAZEL, Primary Examiner

R. V. RUSH, Assistant Examiner

U.S. Cl. X.R.

424—272